US007145436B2

(12) United States Patent
Ichikawa et al.

(10) Patent No.: US 7,145,436 B2
(45) Date of Patent: Dec. 5, 2006

(54) DOOR OPENING AND CLOSING APPARATUS

(75) Inventors: Takashi Ichikawa, Aichi (JP); Terumasa Suyama, Aichi (JP); Ichiro Aoki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 39 days.

(21) Appl. No.: 10/662,494

(22) Filed: Sep. 15, 2003

(65) Prior Publication Data

US 2004/0068935 A1 Apr. 15, 2004

(30) Foreign Application Priority Data

Sep. 19, 2002 (JP) ............................ 2002-272923

(51) Int. Cl.
*H04Q 9/00* (2006.01)
*E05B 65/36* (2006.01)
*E01F 13/00* (2006.01)

(52) U.S. Cl. ......................... 340/5.72; 70/264; 70/257; 70/277; 49/25

(58) Field of Classification Search ............... 340/5.72, 340/825.31; 70/264, 257, 277; 49/25
See application file for complete search history.

(56) References Cited

U.S. PATENT DOCUMENTS 5,497,641 A 3/1996 Linde et al.
5,899,828 A * 5/1999 Yamazaki et al. ............. 477/4
6,038,895 A 3/2000 Menke et al.
6,181,254 B1 * 1/2001 Vogele .................. 340/825.69
6,304,168 B1 * 10/2001 Ohta et al. ................. 340/5.72
6,575,003 B1 * 6/2003 Dupont ........................ 70/257

FOREIGN PATENT DOCUMENTS

| | | | |
|---|---|---|---|
| DE | 195 47 724 | A1 | 6/1997 |
| DE | 198 35 516 | A1 | 2/2000 |
| DE | 100 52 640 | A1 | 5/2002 |
| JP | 03-208972 | | 9/1991 |
| JP | 2000-145227 | A | 5/2000 |
| JP | 2002-213124 | | 7/2002 |
| WO | WO 80/02710 | A1 | 12/1980 |

* cited by examiner

*Primary Examiner*—Jeffery Hofsass
*Assistant Examiner*—Scott Au
(74) *Attorney, Agent, or Firm*—Crompton, Seager & Tufte, LLC

(57) ABSTRACT

A door opening and closing apparatus has a motor, a door latch and a power generation mechanism. When the voltage of the battery is below a level needed to drive the electric actuator, a predetermined manipulation of the power generation mechanism generates the power needed to drive the motor. Therefore, when the voltage of a battery that supplies electric power to the electric actuator is below a level needed to drive the electric actuator, the door opens.

15 Claims, 3 Drawing Sheets

DOOR OPENING AND CLOSING APPARATUS

BACKGROUND OF THE INVENTION

The present invention relates to a door opening and closing apparatus that causes a door to become able to be opened by electrically operating a door latch.

A typical door of a vehicle or a building is opened by a user, or an operator, by inserting a key in a key cylinder located on the door and turning the key. Japanese Laid-Open Patent Publication No. 2002-213124 discloses a door opening and closing apparatus, such as a keyless entry apparatus or a smart entry apparatus, that permits a user to open the door by an electronic control to improve the security and the operability of the door. A key and a key cylinder are omitted in such a door opening and closing apparatus. When a user operates a door handle located on the door, the door latch is electrically operated by an electric actuator, such as a motor.

In the above mentioned door opening and closing apparatus, the apparatus cannot function when the voltage of a battery that supplies electric power to the electric actuator is below a level needed to drive the electric actuator. At this time, even if the operator manipulates the door handle, the door cannot be opened or closed by operating the door latch.

SUMMARY OF THE INVENTION

Accordingly, it is an objective of the present invention to provide a door opening and closing apparatus that opens the door when the voltage of a battery that supplies electric power to the electric actuator is below a level needed to drive the electric actuator.

To achieve the above objective, the present invention provides a door opening and closing apparatus for a vehicle that includes an electric actuator for electrically operating a door latch. The electric actuator is supplied with power driven by a voltage from a battery. The apparatus includes a portable device, a power generation mechanism, and a communication control unit. The portable device is held by a user. The portable device wirelessly transmits an ID signal, which includes an ID code. When the voltage of the battery is below a level needed to drive the electric actuator, a predetermined manipulation of the power generation mechanism generates the power needed to drive the electric actuator. The communication control unit is driven by power of the battery. The communication control unit compares the ID code transmitted from the portable device with an ID code stored in the communication control unit in advance. The communication control unit permits the electric actuator to be driven only when the condition is met that the ID codes coincide with each other. When the voltage of the battery is below a level needed to drive the electric actuator, the communication control unit permits the electric actuator to be driven based on the condition that the ID codes coincide with each other only when the condition is met that power required for driving the electric actuator is obtained by the power generation mechanism.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicular door opening and closing apparatus 10 according to a preferred embodiment of the present invention will now be described with reference to FIGS. 1 to 3.

Figure 1:
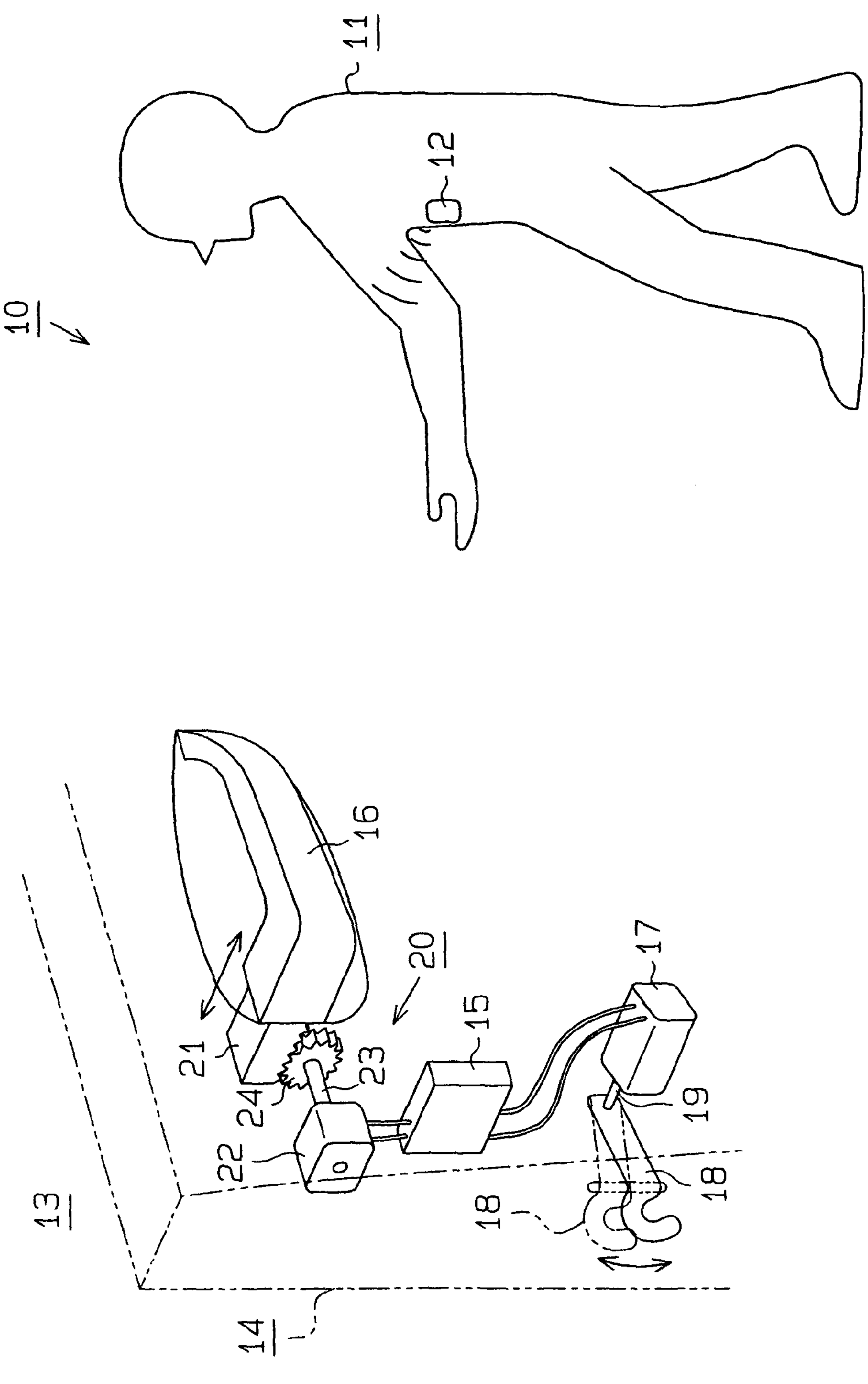
FIG. 1 is a schematic diagram illustrating a door opening and closing apparatus according to a preferred embodiment of the present invention.

As shown in FIG. 1, the door opening and closing apparatus 10 includes a portable device 12, which is held by a user (driver) 11, and a communication control unit 15, which is located in a door 14 of a vehicle 13. The door opening and closing apparatus 10 further includes a manipulation member, which is a door handle 16 in this embodiment, an electric actuator, which is a motor 17 in this embodiment, and a door latch 18. In FIG. 1, components of the door opening and closing apparatus 10 mounted on the vehicle 13 are exaggerated.

The door handle 16 is located on the outer surface of the door 14. The user 11 manipulates the door handle 16 to selectively open and close the door 14. The motor 17 is electrically connected to the communication control unit 15. The motor 17 is driven in accordance with drive signals sent from the communication control unit 15. The door latch 18 is attached to a rotary shaft 19 of the motor 17. The door latch 18 is rotated with the rotary shaft 19 to be selectively engaged with and disengaged from an engaging portion (not shown) located on a vehicle body. When the door latch 18 is engaged with the engaging portion, the door 14 is switched to a locked state. When the door latch 18 is disengaged from the engaging portion, the door 14 is switched to an unlocked state.

A power generation mechanism 20 is located in the door 14. The power generation mechanism 20 includes a rod, which is a rack gear 21 in this embodiment, and a generator 22. The rack gear 21 extends from the door handle 16 toward the inside of the door 14. A pinion gear 24, which meshes with the rack gear 21, is attached to a drive shaft 23 of the generator 22. When the user 11 manipulates the door handle 16, the pinion gear 24 and the drive shaft 23 are rotated by the movement of the rack gear 21. Accordingly, the generator 22 generates power.

The electrical structure of the door opening and closing apparatus 10 will now be described.

Figure 2:
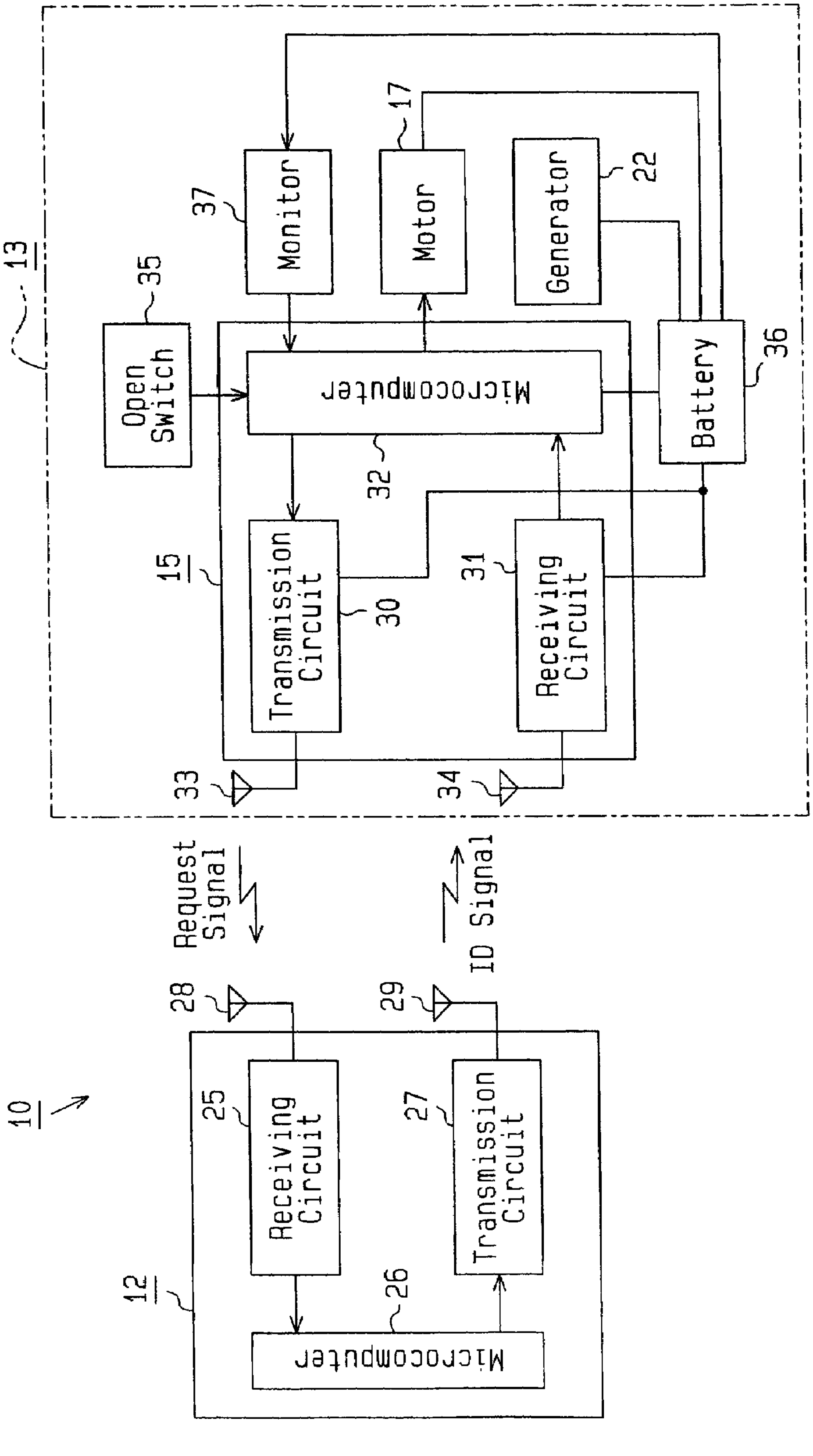
FIG. 2 is a block diagram illustrating a structure of the door opening and closing apparatus shown in FIG. 1.
Figure 3:
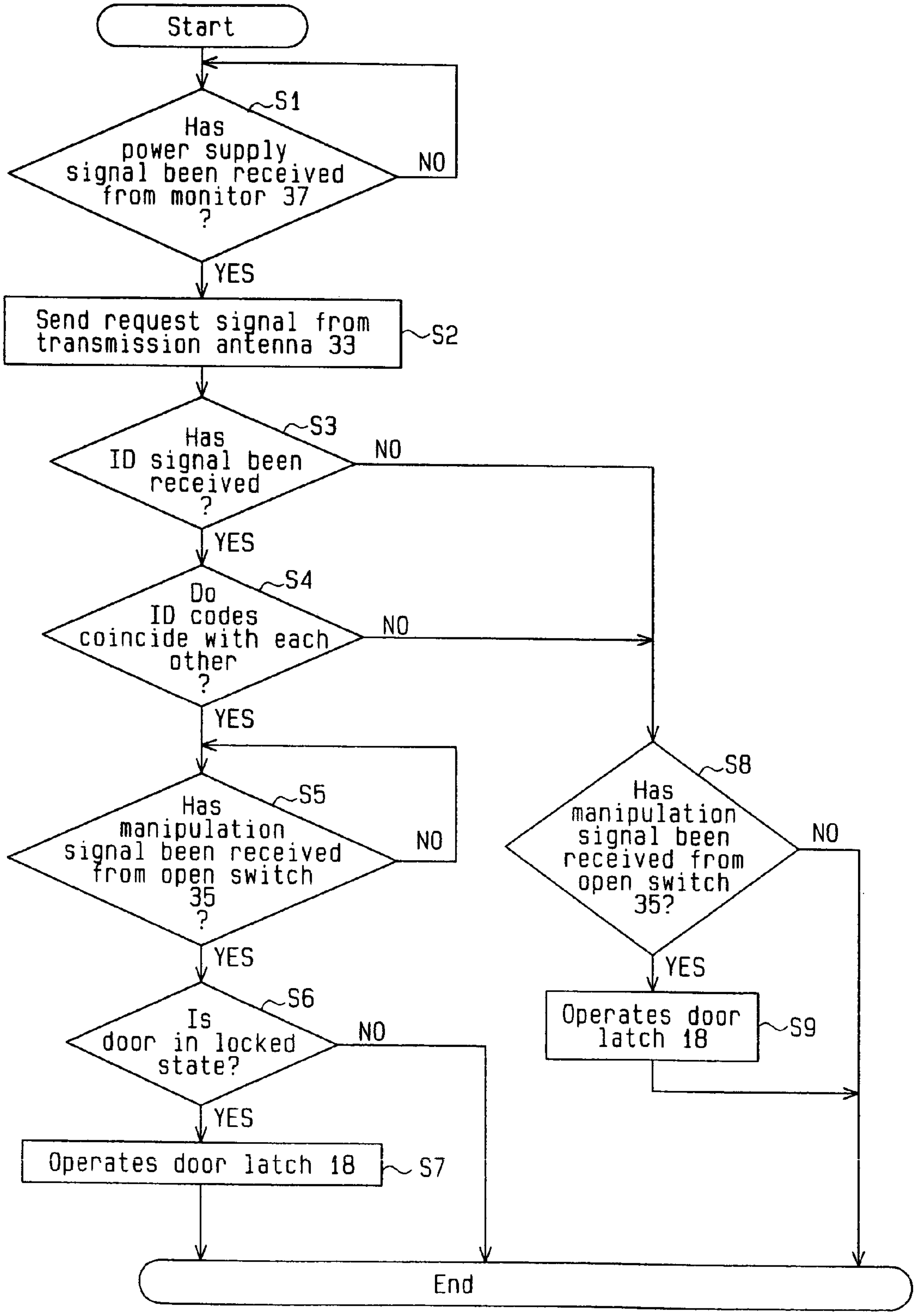
FIG. 3 is a flow chart illustrating an operation of the door opening and closing apparatus shown in FIG. 1.

As shown in FIG. 2, the portable device 12 includes a receiving circuit 25, a microcomputer 26, and a transmission circuit 27.

The receiving circuit 25 of the portable device 12 receives a request signal from the communication control unit 15 of the vehicle 13 via a receiving antenna 28. The receiving circuit 25 sends the request signal to the microcomputer 26. Upon receipt of the request signal from the receiving circuit 25, the microcomputer 26 sends out an ID signal that includes an ID code. The transmission circuit 27 modulates the ID signal to an electric wave of a predetermined frequency, and wirelessly transmits the electric wave to the outside via a transmission antenna 29.

The communication control unit 15 includes a transmission circuit 30, a receiving circuit 31, and a controller, which is a microcomputer 32. The transmission circuit 30 sends out the request signal that is sent from the microcomputer 32 through a transmission antenna 33. The receiving circuit 31 receives the ID signal wirelessly transmitted from the portable device 12 via a receiving antenna 34, and demodulates the ID signal to a pulse signal to generate a receiving signal. The receiving circuit 31 of the communication control unit 15 sends the receiving signal to the microcomputer 32.

The microcomputer is connected to a detection device, which is an open switch 35 in this embodiment, and the motor 17. The open switch 35 sends a manipulation signal to the microcomputer 32 when the door handle 16 is manipulated. The motor 17 is driven based on a drive signal sent from the microcomputer 32.

The microcomputer 32 is further connected to a battery 36, a monitor 37, and the generator 22. The battery supplies power to the transmission circuit 30, the receiving circuit 31, the microcomputer 32, the motor 17, and the monitor 37. Power is supplied to the battery 36 from the generator 22. The monitor 37 constantly monitors whether the battery 36 has enough power for electrically operating the door latch 18. When the battery 36 has enough power for electrically operating the door latch 18, the monitor 37 sends a power supply signal to the microcomputer 32. When the user 11 manipulates the door handle 16, the door handle rotates the generator 22, which generates power, which is stored in the battery 36.

The microcomputer 32 is a central processing unit (CPU), which includes a ROM and a RAM. The microcomputer 32 intermittently sends the request signal to the transmission circuit 30. A predetermined ID code is stored in the microcomputer 32. When receiving the receiving signal from the receiving circuit 31, the microcomputer 32 compares the ID code stored in the microcomputer 32 with the ID code included in the receiving signal.

When the ID codes coincides with each other, and the manipulation signal from the open switch 35 and the power supply signal from the monitor 37 are received, the microcomputer 32 starts supplying power to the motor 17 to drive the motor 17. At this time, the door latch 18 is operated and the door 14 is switched to the unlocked state. The door opening and closing apparatus 10 functions as a smart entry apparatus. When the manipulation signal is no longer received, the microcomputer 32 determines that the door 14 is closed and drives the motor 17. At this time, the door latch 18 is operated and is switched to the locked state.

When the voltage of the battery 36 is below a level needed to operate the motor 17, the microcomputer 32 is activated by power obtained by the generator 22 when the door handle 16 is manipulated. That is, when the power supply signal is no longer received due to decrease of the voltage of the battery 36, the microcomputer 32 is activated by power of the generator 22 obtained by the manipulation of the door handle 16. Further, when power that is enough for electrically operating the door latch 18 is obtained by the generator 22 by repeatedly manipulating the door handle 16, the power supply signal is sent to the microcomputer 32 from the monitor 37. When the ID code of the microcomputer 32 and the ID code included in the receiving signal coincide with each other, and the manipulation signal from the open switch 35 is received, the microcomputer 32 drives the motor 17. As a result, the door latch 18 is operated and is switched to the unlocked state.

The operations performed by the door opening and closing apparatus 10 will now be described.

At first, when the user 11 manipulates the door handle 16, the manipulation signal is sent to the microcomputer 32 from the open switch 35. As shown in FIG. 3, in step S1, the microcomputer 32 determines whether the power supply signal is received from the monitor 37. If the decision outcome in step S1 is positive, the microcomputer 32 determines that the battery 36 has power that is enough for operating the door latch 18, and proceeds to step S2. In step S2, the microcomputer 32 sends the request signal from the transmission antenna 33 of the communication control unit 15 to the receiving antenna 28 of the portable device 12. On the other hand, if the decision outcome of step S1 is negative, that is, if the power supply signal is not sent to the microcomputer 32, the microcomputer 32 does not transmit the request signal to the receiving antenna 28 until power that is enough for electrically operating the door latch 18 is obtained by the generator 22 by repeatedly manipulating the door handle 16.

In step S3, the microcomputer 32 determines whether the communication control unit 15 has received the ID signal wirelessly transmitted from the portable device 12 in response to the request signal. If the decision outcome of step S3 is positive, that is, if the communication control unit 15 has received the ID signal, the microcomputer 32 proceeds to step S4. In step S4, the microcomputer 32 determines whether the ID code wirelessly transmitted from the portable device 12 coincides with the ID code stored in the microcomputer 32. If the decision outcome of step S4 is positive, that is, if the ID codes coincide with each other, the microcomputer 32 proceeds to step S5. In step S5, the microcomputer 32 determines whether the manipulation signal is received from the open switch 35. If the decision outcome of step S5 is positive, that is, if the microcomputer 32 receives the manipulation signal from the open switch 35, the microcomputer proceeds to step S6. In step S6, the microcomputer 32 determines whether the door 14 is in the locked state. If the decision outcome of step S6 is positive, that is, if the door 14 is in the locked state, the microcomputer 32 proceeds to step S7. In step S7, the microcomputer 32 operates the door latch 18 by the motor 17, and switches the door 14 to the unlocked state. When the microcomputer 32 is not receiving the manipulation signal, and when the door 14 is in the unlocked state, the door latch 18 is not operated.

On the other hand, if the decision outcome of step S3 is negative, that is, if the communication control unit 15 has not received the ID signal, or if the decision outcome of step S4 is negative, that is, if the ID codes do not coincide with each other, the microcomputer 32 proceeds to step S8. In step S8, the microcomputer 32 determines whether the door 14 is in the unlocked state. If the decision outcome of step S8 is positive, the microcomputer 32 proceeds to step S9. In step S9, the microcomputer 32 operates the door latch 18 to switch the door 14 to the locked state. On the other hand, if the decision outcome of step S8 is negative, the microcomputer 32 temporarily terminates the procedure.

The preferred embodiment provides the following advantages.

If the user 11 manipulates the door handle 16 when the voltage of the battery 36 is below a level needed to drive the motor 17, the generator 22 generates power. When power required for electrically operating the door latch 18 is obtained by the power of the generator 22, the motor 17 can be driven by the obtained power. Therefore, the door 14 can be opened by electrically operating the door latch 18.

The generator 22 generates power by manipulation of the door handle 16. Therefore, the power sufficient for driving the motor 17 is obtained by the normal operation of manipulating the door handle 16. Thus, the door 14 is opened without causing the user 11 to feel uncomfortable.

When the user 11 repeatedly manipulates the door handle 16, power is obtained by the generator 22 that is enough for electrically operating the door latch 18. In this state, the motor 17 operates the door latch 18, and switches the door 14 to the unlocked state. That is, if the power of the battery 36 is decreased, the door 14 cannot be opened unless the user 11 manipulates the door handle 16 several times. Therefore, the user 11 is prompted to exchange the battery 36 by the number of times of manipulation of the door handle 16.

The monitor 37 sets the motor 17 to supply power based on the detection that the battery 36 has power sufficient for electrically operating the door latch 18. Therefore, the motor 17 is reliably driven as compared to a case where the power obtained by the generator 22 is directly supplied to the motor 17.

The door opening and closing apparatus 10 has no conventional mechanism, such as a mechanical key or a key cylinder. Therefore, as compared to a case where the conventional mechanism is provided, the structure of the door opening and closing apparatus 10 is simple, and the cost for manufacturing the door opening and closing apparatus 10 is reduced. The door 14 is prevented from being opened by a thief by inserting a picking tool into the key cylinder. Therefore, the antitheft performance of the vehicle 13 is improved. Further, it is not required to take into consideration of the key cylinder when designing the vehicle 13. This adds to the flexibility of the design of the vehicle 13.

The motor 17 is driven when power required to electrically operate the door latch 18 is obtained by the power generation mechanism 20, and when the ID code included in the ID signal coincides with the ID code stored in the microcomputer 32. Therefore, if the ID codes do not coincide with each other, the motor 17 cannot be driven although power required for electrically operating the door latch 18 is obtained. Therefore, the door 14 cannot be opened without the portable device 12. Thus, the security of the door opening and closing apparatus 10 is improved.

It should be apparent to those skilled in the art that the present invention may be embodied in many other specific forms without departing from the spirit or scope of the invention. Particularly, it should be understood that the invention may be embodied in the following forms.

The generator 22 need not generate power by manipulation of the door handle 16, but may generate power by, for example, manipulation of a manipulation member, such as a door knob. The generator 22 may also generate power by manipulation of a member other than manipulation members, such as a door mirror and an antenna of the vehicle 13.

The motor 17 may be driven only when the microcomputer 32 receives the power supply signal from the monitor 37.

The microcomputer 32 need not be activated by power obtained by the generator 22. That is, the power obtained by the generator 22 may be directly supplied to the motor 17.

Instead of using the motor 17 as an electric actuator, for example, a solenoid may be used as the electric actuator. In this case, for example, a solenoid plunger is connected to the door latch 18. When the solenoid is driven, the door latch 18 is operated and is selectively engaged with and disengaged from the engaging portion (not shown) located on the vehicle body.

The present invention may be applied to a keyless entry apparatus in which the ID codes are compared with each other when the user 11 manipulates a lock switch or an unlock switch located on the portable device 12. In this case, when the voltage of the battery 36 to be supplied to the motor 17 is decreased, the door handle 16 is manipulated while manipulating the unlock switch. Accordingly, the motor 17 is driven to switch the door 14 to the unlocked state.

The door opening and closing apparatus 10 may be used for opening and closing a door of a building, such as housing, or a window. With this structure, the door of a building or a window can be opened and closed even during blackouts.

The present examples and embodiments are to be considered as illustrative and not restrictive and the invention is not to be limited to the details given herein, but may be modified within the scope and equivalence of the appended claims.

The invention claimed is:

1. A door opening and closing apparatus for a vehicle that includes an electric actuator for electrically operating a door latch, wherein the electric actuator is driven by power of a battery, the apparatus comprising:

a portable device held by a user, wherein the portable device wirelessly transmits an ID signal, which includes an ID code;

a power generation mechanism, and a communication control unit, which is driven by power of the battery, wherein the communication control unit compares the ID code transmitted from the portable device with an ID code stored in the communication control unit in advance, wherein the communication control unit permits the electric actuator to be driven only when the condition is met that the ID codes coincide with each other, and wherein, when the voltage of the battery is below a level needed to drive the electric actuator, the communication control unit permits the electric actuator to be driven based on the condition that the ID codes coincide with each other only when the condition is met that power required for driving the electric actuator is obtained by the power generation mechanism, wherein the communication control unit is capable of wirelessly transmitting a request signal when the battery has enough power to drive the electric actuator, wherein the portable device wirelessly transmits the ID signal upon receipt of the request signal, and wherein, when the voltage of the battery is below the level needed to drive the electric actuator, the communication control unit does not transmit the request signal until power required for driving the electric actuator is obtained by the power generation mechanism regardless of whether the communication control unit is supplied with power required for transmitting the request signal.

2. The door opening and closing apparatus according to claim 1, further comprising a manipulation member, which is manipulated to selectively open and close a door, wherein the power generation mechanism generates power in accordance with manipulation of the manipulation member.

3. The door opening and closing apparatus according to claim 2, wherein, when the manipulation member is repeatedly manipulated, the power needed to drive the electric actuator is obtained.

4. The door opening and closing apparatus according to claim 1, wherein power generated by the power generation mechanism is stored in the battery.

5. The door opening and closing apparatus according to claim 4, wherein the communication control unit drives the electric actuator using power stored in the battery by the power generation mechanism.

6. The door opening and closing apparatus according to claim 1, further comprising a monitor for monitoring whether the battery has enough power for driving the electric actuator.

7. The door opening and closing apparatus according to claim 6, wherein the communication control unit determines whether the battery has power needed to drive the electric actuator based on a signal from the monitor.

8. A door opening and closing apparatus for a vehicle that includes an electric actuator for electrically operating a door latch, wherein the electric actuator is driven by power of a battery, the apparatus comprising:

a portable device held by a user, wherein the portable device wirelessly transmits an ID signal, which includes an ID code;

a manipulation member, which is manipulated to selectively open and close a door;

a power generation mechanism, which generates power in accordance with a manipulation of the manipulation member;

a detection device for detecting whether the manipulation member has been manipulated; and a communication control unit, which is driven by power of the battery, wherein the communication control unit compares the ID code transmitted from the portable device with an ID code stored in the communication control unit in advance, wherein the communication control unit permits the electric actuator to be driven only when the conditions are met that the ID codes coincide with each other and that the manipulation member has been manipulated based on a detection signal from the detection device, and wherein, when the voltage of the battery is below a level needed to drive the electric actuator, the communication control unit permits the electric actuator to be driven based on the conditions that the ID codes coincide with each other and that the manipulation member has been manipulated only when the condition is met that power required for driving the electric actuator is obtained by the power generation mechanism, wherein the communication control unit is capable of wirelessly transmitting a request signal when the battery has enough power to drive the electric actuator, wherein the portable device wirelessly transmits the ID signal upon receipt of the request signal, and wherein, when the voltage of the battery is below the level needed to drive the electric actuator, the communication control unit does not transmit the request signal until power required for driving the electric actuator is obtained by the power generation mechanism regardless of whether the communication control unit is supplied with power required for transmitting the request signal.

9. The door opening and closing apparatus according to claim 8, wherein, when the manipulation member is repeatedly manipulated, the power needed to drive the electric actuator is obtained.

10. The door opening and closing apparatus according to claim 8, wherein power generated by the power generation mechanism is stored in the battery.

11. The door opening and closing apparatus according to claim 10, wherein the communication control unit drives the electric actuator using power stored in the battery by the power generation mechanism.

12. The door opening and closing apparatus according to claim 8, further comprising a monitor for monitoring whether the battery has enough power for driving the electric actuator.

13. The door opening and closing apparatus according to claim 12, wherein the communication control unit determines whether the battery has power needed to drive the electric actuator based on a signal from the monitor.

14. The door opening and closing apparatus according to claim 6, wherein the monitor sends a power supply signal to the communication control unit when the battery has enough power for driving the electric actuator, wherein the communication control unit is capable of wirelessly transmitting the request signal when receiving the power supply signal, and wherein, when not receiving the power supply signal, the communication control unit does not transmit the request signal until power required for driving the electric actuator is obtained by the power generation mechanism regardless of whether the communication control unit is supplied with power required for transmitting the request signal.

15. The door opening and closing apparatus according to claim 12, wherein the monitor sends a power supply signal to the communication control unit when the battery has enough power for driving the electric actuator, wherein the communication control unit is capable of wirelessly transmitting the request signal when receiving the power supply signal, and wherein, when not receiving the power supply signal, the communication control unit does not transmit the request signal until power required for driving the electric actuator is obtained by the power generation mechanism regardless of whether the communication control unit is supplied with power required for transmitting the request signal.

* * * * *